United States Patent
Mouchoux et al.

(10) Patent No.: US 9,175,638 B2
(45) Date of Patent: Nov. 3, 2015

(54) TURBOJET ENGINE OUTLET LOBE MIXER WITH GUIDING PROTRUSIONS, AND METHOD OF MIXING AIRFLOWS

(75) Inventors: Pierrick Mouchoux, Paris (FR); Eric De Vulpillieres, Paris (FR); Gaetan Jean Mabboux, Boulogne Billancourt (FR); Marion Verdier, Chartrettes (FR)

(73) Assignee: SNECMA, Paris (FR)

( * ) Notice: Subject to any disclaimer, the term of this patent is extended or adjusted under 35 U.S.C. 154(b) by 328 days.

(21) Appl. No.: 13/600,605

(22) Filed: Aug. 31, 2012

(65) Prior Publication Data
US 2013/0056553 A1 Mar. 7, 2013

(30) Foreign Application Priority Data

Sep. 1, 2011 (FR) ...................................... 11 57711

(51) Int. Cl.
| *F02K 3/077* | (2006.01) |
| *F02K 1/38* | (2006.01) |
| *F02K 1/48* | (2006.01) |

(Continued)

(52) U.S. Cl.
CPC . *F02K 3/077* (2013.01); *F02K 1/34* (2013.01); *F02K 1/386* (2013.01); *F02K 1/48* (2013.01); *B64D 33/06* (2013.01); *F02K 1/46* (2013.01); *F05D 2250/184* (2013.01); *F05D 2260/96* (2013.01)

(58) Field of Classification Search
CPC ............. F02K 1/34; F02K 1/386; F02K 1/48; F02K 1/46; F02K 3/077; F05D 2260/96; F05D 2250/182; F05D 2250/183; F05D 2250/184; B64D 33/06

USPC ......... 60/226.1, 39.5, 226.2, 226.3, 230, 770, 60/262; 239/265.25, 265.27, 265.19; 183/213, 220

See application file for complete search history.

(56) References Cited

U.S. PATENT DOCUMENTS

| 4,302,934 A | * | 12/1981 | Wynosky et al. | ................ 60/262 |
| 5,117,628 A | | 6/1992 | Koshoffer | |
| 5,127,602 A | * | 7/1992 | Batey et al. | .................... 244/1 N |

(Continued)

FOREIGN PATENT DOCUMENTS

| FR | 2 657 399 | 7/1991 |
| FR | 2 892 152 A1 | 4/2007 |

OTHER PUBLICATIONS

French Preliminary Search Report and Written Opinion issued Apr. 16, 2012 in corresponding French Application No. 11 57711 (with an English Translation of Categories).

*Primary Examiner* — Phutthiwat Wongwian
*Assistant Examiner* — Alain Chau
(74) *Attorney, Agent, or Firm* — Oblon, McClelland, Maier & Neustadt, L.L.P.

(57) ABSTRACT

The invention aims at providing a sufficient air exchange in the engine area without raising the static pressure in the outlet area of the air exchange duct. In order to do this, the invention provides for an outlet section capable of concentrating the outlet of the exchange airflow towards zones with smaller static pressure. A turbojet engine outlet according to the invention provides an engine cowl, which comprises an external wall of a circumferential duct in which circulates an exchange airflow of the turbines, and an airflow mixer. At the outlet, the duct delivers the exchange airflow towards the mixer for the primary and secondary airflows of the turbojet engine. The mixer presents hot and cold lobes. In particular, the engine outlet also includes guiding of the exchange airflow towards the cold lobes.

12 Claims, 3 Drawing Sheets

(51) Int. Cl.
*F02K 1/34* (2006.01)
*F02K 1/46* (2006.01)

(56) References Cited

U.S. PATENT DOCUMENTS 5,638,675 A    6/1997  Zysman et al.
5,775,095 A    7/1998  Zysman et al.
7,114,323 B2 * 10/2006 Schlinker et al. ............... 60/204
2008/0271431 A1  11/2008 Porte
2008/0302083 A1  12/2008 Sloan et al.
2011/0167785 A1   7/2011 Moore et al.
2011/0167786 A1 * 7/2011 Marques et al. ................ 60/204

* cited by examiner

TURBOJET ENGINE OUTLET LOBE MIXER WITH GUIDING PROTRUSIONS, AND METHOD OF MIXING AIRFLOWS

TECHNICAL FIELD

The invention relates to a method for mixing primary and secondary airflows in an aircraft turbojet engine, as well as to an engine output capable of implementing such a method.

In turbojet engines with mixed double airflow, the air exchange of the engines allows to optimize their operation in the entire domain of flight: takeoff, cruise, search, landing, whatever is the by-pass ratio between the primary and secondary airflows.

Turbofans (turbojet engines with double airflow) are generally equipped with an air blower which provides the major part (for example, 80%) of the thrust. They comprise, from upstream to downstream with respect to the air flow, the air blower, compressors stages, one or more combustion chambers, expansion turbines stages and two jet nozzles: nozzle for hot primary airflow, which comes from combustion, and nozzle for cold secondary airflow, which comes from the air blower outwardly concentric with the primary airflow.

More precisely, the secondary airflow flows in-between an engine cowl, which protects all the compression/expansion coupling systems, and a fairing of the engine nacelle which surrounds the engine. Besides, the engine is attached to the aerofoils or the fuselage via an engine mount stand.

The primary and secondary airflows can remain separated and, in that case, the primary airflow nozzle protrudes outside the engine nacelle around the exhaust cone. However, the primary and secondary airflows can be also mixed before exhaust thereby optimizing the whole thrust provided by the airflows and decreasing the exhaust noises. The primary airflow nozzle is then immersed in the engine nacelle which has a long span.

STATE OF THE ART

In the case of turbojet engines with mixed airflows, the air exchange of the turbines and surrounding equipments forming the engine area is generally provided by injecting a small part of the secondary airflow under this cowl.

At the outlet of the engine area, this exchange airflow is exhausted at a confluence area between the primary airflow and the main secondary airflow where a mixer promotes the heat exchanges between both main airflows and gives rise to optimized thrust and decreased noise. In particular, the state of the art reveals mixers with lobes, particularly effective, as described in patent documents EP 1 870 589 or US 2010 126 183 filed in the name of the applicant.

As shown in FIG. 1 by a partial schematic cross-sectional view of a turbojet engine end and as shown in FIGS. 2a and 2b by (partial) back and side perspective views of this end, the outlet of the exchange airflow (arrow F1) is carried out in an annular duct C1 formed between a circumferential ferrule V1, located at the trailing edge of the engine cowl K1, and an internal fairing K2 protecting the turbines T1.

The static pressure of the air exchange directly provides the pressure at the outlet of the engine area. The more this pressure is, the more the initial scoop of dynamic bleed of the exchange airflow F1 is important to provide the sufficient exchange airflow rate in the confluence area Z1 of the airflows. The confluence is realized between the primary airflow Fp—hot, coming from the combustion of gases and exhausting around the nozzle cone Tc—and the secondary airflow Fs—which is cold—directly coming from the air blower (not shown) and passing in-between the engine nacelle N1 and the engine cowl K1.

A circumferential mixer M1 is provided in this confluence area. Such a mixer consists of alternated hot lobes 31 and cold lobes 32. The hot lobes 31 are convex and present a crest which follows a radially increasing slope from upstream to downstream, while the cold lobes 32 are concave and present a valley which follows a radially decreasing slope from upstream to downstream. In these circumstances (see particularly FIG. 1), the primary airflow Fp, generally oriented depending on a direction which goes away from the longitudinal axis X'X of the turbojet engine, is coiled (inwardly) in the hot lobes 31, while the secondary airflow Fs, generally directed depending on a direction which converges on the longitudinal axis X'X, comes to flow (outwardly) along the cold lobes 32. So, the lobes form alternated sections of hot and cold airflow. But the obstruction created by the presence of the mixer M1 leads to areas with high local increase of the static pressure upstream to the hot lobes 31.

And a high pressure entails greater sized bleeding scoops and then causes an energy loss in the secondary airflow Fs.

Besides, the outlet section of the annular duct C1 is sized for the critical case of "burst-duct" (in English terminology). This accounting implies an outlet section remarkably more large than the nominal one. An important air recirculation results in the outlet section of the air exchange annular duct C1.

DISCLOSURE OF THE INVENTION

The invention aims at providing a sufficient air exchange in the engine area with a static pressure in the outlet area of the air exchange duct so small as possible, allowing to reduce the size of the air bleeding scoops upstream while maintaining the nominal section of the air exchange duct at the outlet.

In order to do this, it was observed that the azimuthal variation of the static pressure, in the cold lobes area, presents smaller static pressures. Then, the invention provides for an outlet section capable of concentrating the outlet of the exchange airflow towards areas with smaller static pressure.

More exactly, the object of the present invention is to provide a method for mixing primary and secondary airflows of an aircraft turbojet engine comprising an exchange airflow of the engine area circulating in a duct after being bled from the secondary airflow. At the outlet, the exchange airflow is delivered towards the direction of a confluence area where the primary and secondary airflows are alternately fractionated with an azimuthal and alternated variation of the static pressure before being dynamically mixed. In this method, the exchange airflow is oriented towards the coldest sectors of the confluence area of the airflows corresponding to areas with smaller static pressure.

This solution allows to minimize the outlet static pressure and thus to implement a minimized bleeding of secondary airflow, i.e. the energy losses of the turbojet engine are also minimized.

Advantageously, the guiding of the exchange airflow is chosen between a guiding inferred by an evolutionary cut of the air exchange duct and a guiding inferred by a boss formed at the outlet of this airflow.

Preferably, in case the mixture between the primary and secondary airflows is provided from an alternation of the fractions of primary and secondary airflows in the confluence area, the guiding of the exchange airflow is alternately carried out towards the flow sectors of the fractions of cold secondary airflow.

The invention also relates to a turbojet engine outlet capable of implementing such a method. This outlet includes an engine cowl which comprises an external wall of a circumferential duct in which circulates an exchange airflow of the turbojet engine turbines and an airflow mixer. At the outlet, the duct delivers the exchange airflow towards the mixer for the primary and secondary airflows of the turbojet engine. The mixer presents hot and cold longitudinal lobes extending according to alternated directions to separately drive sections of cold secondary airflow and hot primary airflow. The engine outlet then comprises guiding means capable of orienting the exchange airflow towards the cold lobes of the mixer.

According to an embodiment, the engine cowl presents at an end a collar having a periodic azimuthal cut protruding towards the hot lobes so as to guide the exchange airflow towards the cold lobes of the mixer.

In particular, the protrudings have curved ends, rounded or with sinusoidal shape or equivalent, so as to provide a good mechanical behaviour by limiting the vibrations of protrudings.

According to another embodiment, bosses are formed in the outlet area of the exchange airflow on a fairing forming the internal wall of the air exchange duct, next to each hot lobe of the mixer so as to guide the exchange airflow towards the cold lobes of the mixer.

DESCRIPTION OF THE DRAWINGS

Others data, characteristics and advantages of the present invention will become evident in reading of the not limited description which follows, with reference to the appended drawings which represent, respectively.

DETAILED DESCRIPTION

Herein, the term "axial" means parallel to the longitudinal axis of a turbojet engine, the term "radial" defining itself with respect to this longitudinal axis. The terms "upstream" and "downstream" relate to the global direction of the air flows along the longitudinal axis of a turbofan, from the entrance to an air boot of air blower to their final exhaust in the nozzle. In the figures, the various longitudinal lines which appear on the lobes allow to suggest the curvatures of these lobes by the density of closure and their own curvature. Besides, the terms "hot lobes" and "cold lobes" indicate the lobes which guide respectively the hot primary airflow and the cold secondary airflow.

Figure 3:
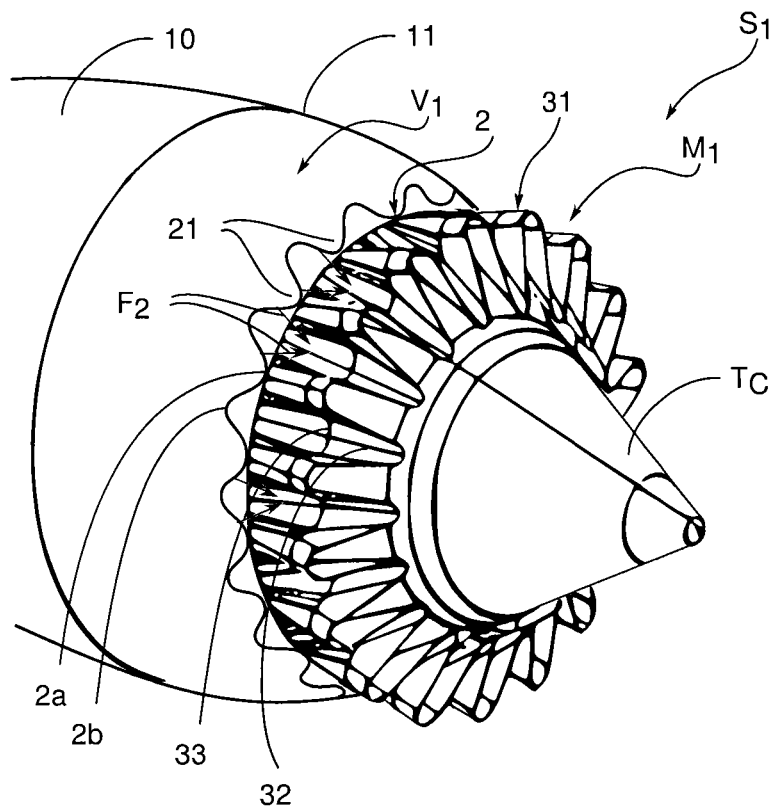
FIGS. 3 and 4, perspective and (partial) side views of a back end of a turbojet engine equipped with a mixer with lobes and of an example of engine cowl according to the invention.
Figure 4:
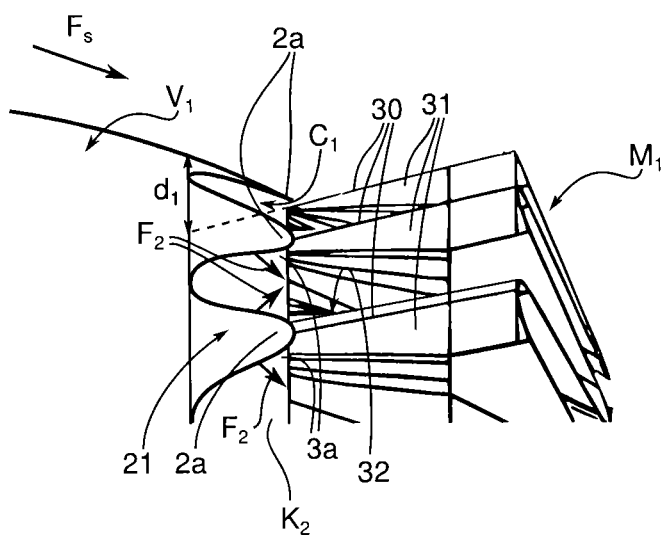

Referring to perspective and front (partial) views of a back end of turbojet engine, in the FIGS. 3 and 4, equipped with a nozzle cone Tc, a mixer M1 with lobes is adapted on the internal fairing K2 of the turbines (not visible) of this turbojet engine. At the trailing edge of the end ferrule V1 of the engine cowl 10, the radial gap d1 (FIG. 4) between the internal fairing K2 and this engine cowl 10 defines the outlet section of the air exchange duct C1. These various references also appear in FIG. 6 which illustrates a longitudinal cross-sectional view of an engine outlet according to the invention.

In the illustrated example, the ferrule V1 of the engine cowl 10 is prolonged by a collar 2. The collar 2, the internal fairing K2 beyond the outlet section of the duct C1, and the mixer M1 form the engine outlet S1 of the turbojet engine.

The collar 2 presents axial protrudings 21 having a generally triangular shape, regularly distributed on its circumference. Apexes 2a, 2b of the triangles of the collar are rounded giving to the cut of the collar 2 a generally sinusoidal shape. Then, the curved ends allow to essentially limit the vibrations of the collar.

In the example, the ferrule V1 of the engine cowl 10 presents an annular convex embossing 11. The end 2a of each axial protruding 21 is radially provided in way of the crest 30 of a hot lobe 31, so that the protruding 21 "covers" the beginning 3a of this hot lobe 31, at the outlet of the fairing K2. The protrudings 21 present, in longitudinal cross-section, as it is better shown in FIGS. 4 and 6, a profile in the continuation of the engine cowl 10 with a light inversion of concave curvature towards their ends 2a to get quasi-asymptotically closer to the hot lobes 31, while staying at a definite distance D1 (see below).

Figure 1:
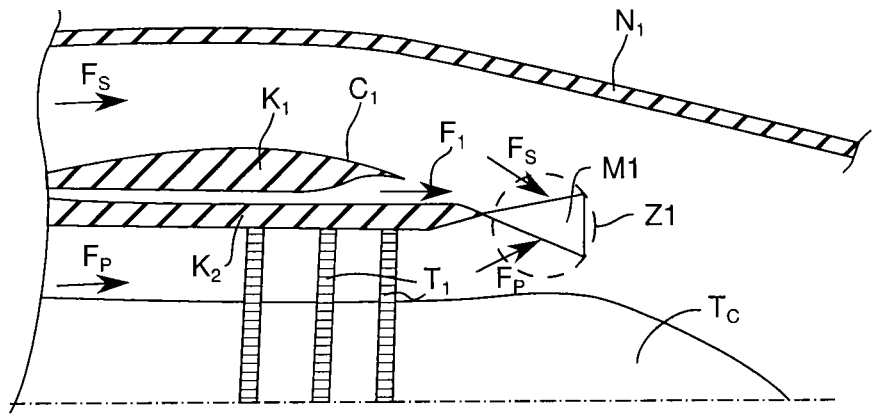
FIGS. 1, 2a and 2b, a partial cross-sectional view of a back end of a turbojet engine having a mixer with lobes and perspective and (partial) side views of this end.
Figure 2A:
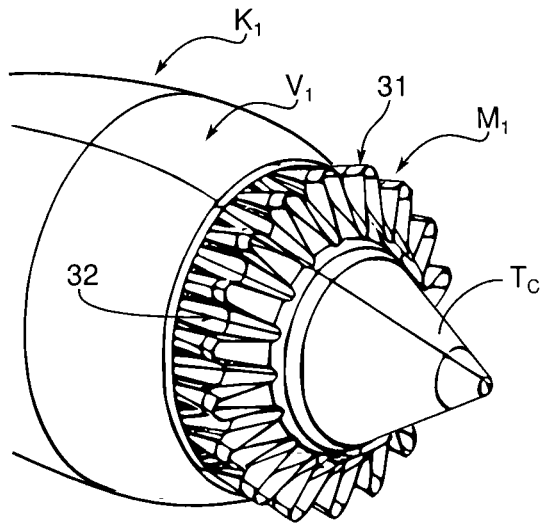
Figure 2B:
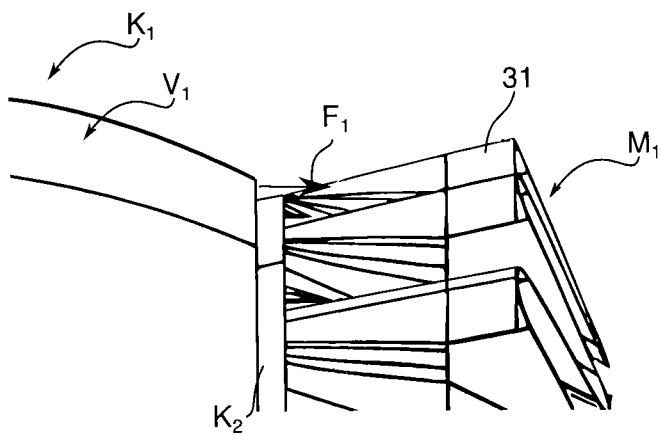

In these circumstances, the exchange airflow F1—delivered toward the confluence area of the primary and secondary airflows (referring particularly to the FIG. 1)—is guided at the end of the duct C1 towards the cold lobes 32 (arrows F2). These cold lobes radially present a concave curvature and, longitudinally, decreasing valleys 33 from upstream to downstream towards the longitudinal axis, contrary to the hot lobes. The exchange airflow F2 is so oriented beyond the air exchange duct C1 towards areas of the mixer M1 having smaller static pressure, the presence of the mixer having created, due to its obstruction, a high azimuthal variation of the static pressure. By orienting the exchange airflow F2 towards the cold lobes having small pressure, the size of the scoops can be decreased while obtaining a same exchange airflow rate at the outlet, or it can be maintained to obtain a higher exchange airflow rate.

This solution further reduces the air recirculation at the outlet in nominal operation, while guaranteeing a sufficient opening section of the air exchange duct in case of "burstduct". An air recirculation indeed typically occurs at the root of the hot lobes 31 when the air is not deflected. And this recirculation infers a part of the singular energy loss due to the mixer.

Figure 5:
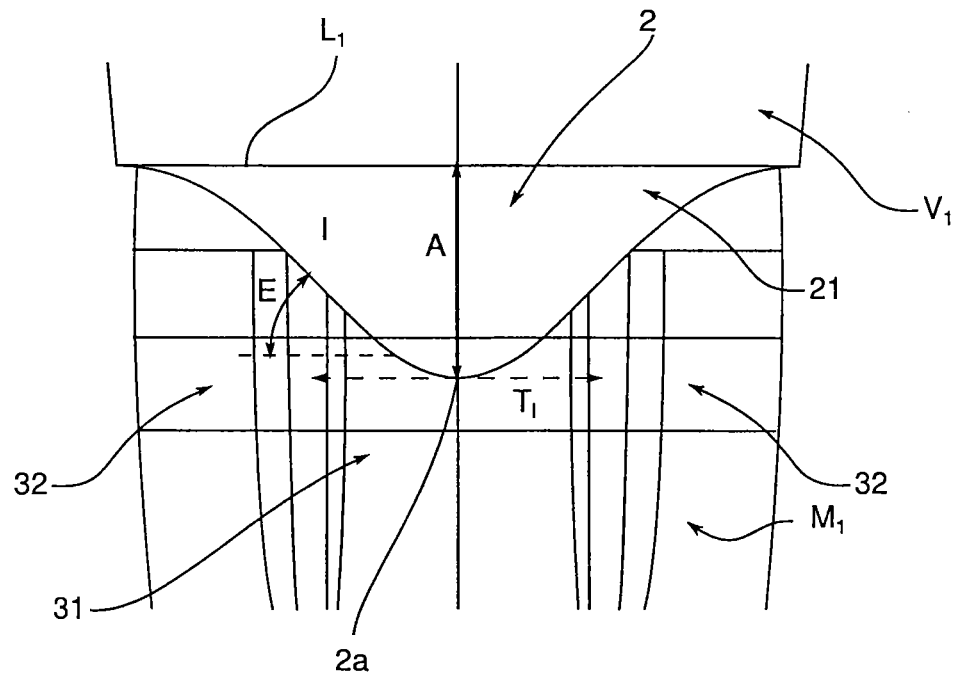
FIGS. 5 and 6, top and longitudinal cross-sectional views of a hot lobe of the mixer and the corresponding collar portion at the end of the engine cowl of an outlet engine according to the invention.
Figure 6:
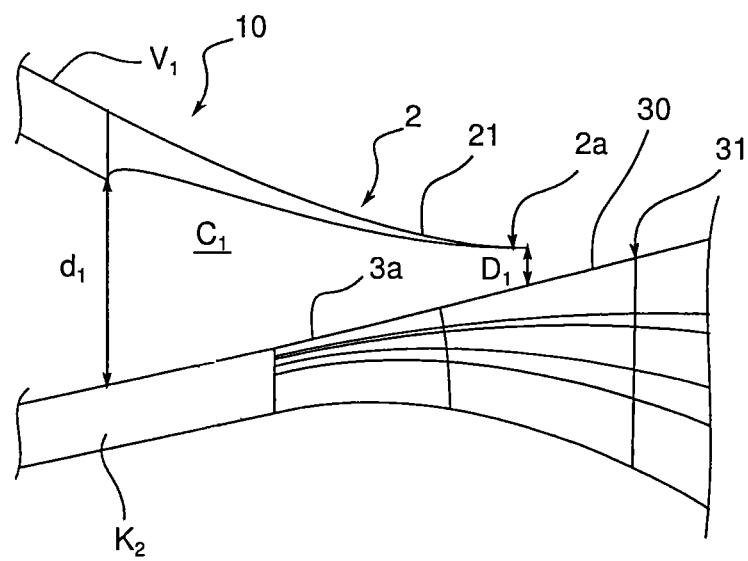

The top and side views of FIGS. 5 and 6 illustrate a hot lobe 31 surrounded with two cold lobes 32 (partially seen) of the mixer, and a corresponding protruding of the collar 21, at the end of the ferrule V1 of the engine cowl 10, of an example of engine outlet according to the invention.

The protruding 21 is a tongue having a sinusoidal cut. The tangent at the inflexion point "I" of the sinusoidal curve forms an angular gap "E" between 40 and 50° with the trailing edge line L1 of the ferrule V1, preferably approximately 45°. The amplitude "A" of the sinusoidal curve remains lower than the projection of the half-width ½ of the lobe 31. The distance D1 between the end of the protrudings 21 and the top crest of the lobe 31 which originates at the end of the internal fairing K2 of the air exchange duct C1, is determined according to a compromise between an optimization of the backlashes to reduce the inferred vibrations and the manufacturing costs of these backlashes.

Of course, the invention is not limited to the described and represented embodiments. In particular, other architectures can be provided for guiding the exchange airflow towards the cold lobes, for example straightener arms provided on the collar or upstream to the lobes.

The invention claimed is:

1. Method for mixing primary hot and secondary cold airflows of an aircraft turbojet engine comprising:
    guiding an exchange airflow of an engine area circulating in an air exchange duct after the exchange airflow is bled from the secondary airflow;
    delivering an output of the exchange airflow towards a confluence area where the primary hot and secondary cold airflows are alternately provided in a circumferential direction using an annular lobe mixer such that an azimuthal variation of the static pressure exists in the confluence area, before being dynamically mixed by the lobe mixer; and
    concentrating the exchange airflow using axial protrudings upstream of the lobe mixer towards coldest sectors of the confluence area of the airflows which correspond to areas with smaller static pressure.

2. Method for mixing airflows according to claim 1, wherein the guiding of the exchange airflow is provided by cuts of the exchange airflow, or provided by a boss formed at the outlet of this airflow.

3. Method for mixing airflows according to claim 1, wherein the guiding of the exchange airflow is alternately carried out towards flow sectors of fractions of the cold secondary airflow.

4. Turbojet engine outlet capable of implementing the method according to claim 1, the outlet comprising:
    an engine cowl, which comprises an external wall of a circumferential duct in which circulates an exchange airflow of the turbojet engine turbines,
    an airflow mixer, wherein the circumferential duct is radially between a primary airflow and a secondary airflow of the turbojet engine and delivers at an outlet thereof, the exchange airflow towards the mixer for the primary and secondary airflows of the turbojet engine, and the mixer presenting hot and cold longitudinal lobes extending according to alternated directions to separately drive sections of cold secondary airflow and hot primary airflow, and a guiding device configured to guide the exchange airflow towards the cold lobes of the mixer.

5. Turbojet engine outlet according to claim 4, wherein the guiding device comprises a collar presented at the end of the engine cowl and having a periodic azimuthal cut having a plurality of protrudings towards the hot lobes so as to guide the exchange airflow towards the cold lobes of the mixer.

6. Turbojet engine outlet according to claim 5, wherein the protrudings have curved ends so as to provide a good mechanical behaviour by limiting the vibrations of the protrudings.

7. Turbojet engine outlet according to claim 6, wherein the protruding is a tongue having a sinusoidal cut and a tangent at the inflexion point of the sinusoidal curve which forms an angle between 40 and 50° with the trailing edge line (L1) of the ferrule (V1), preferably approximately 45°.

8. Turbojet engine according to claim 7, in which the amplitude of the sinusoidal curve remains lower than a half-width of the hot lobes.

9. Turbojet engine according to claim 4, wherein the guiding device is provided at the outlet of the circumferential duct and comprising a plurality of protrudings each having an apex centered on a respective hot lobe.

10. Turbojet engine according to claim 9, wherein said plurality of protrudings are spaced a distance from an outer wall of the respective hot lobe.

11. Engine outlet according to claim 4, wherein bosses are formed in the outlet area of the exchange airflow on a fairing forming an internal wall of the circumferential duct, next to each hot lobe of the mixer so as to guide the exchange airflow towards the cold lobes of the mixer.

12. Turbojet engine according to claim 4, wherein the turbojet engine is a turbofan engine and the secondary airflow flows around the engine cowl.

* * * * *